Oct. 27, 1970 P. B. MASON ET AL 3,536,401

PAPER TRANSPORT SYSTEM

Filed April 22, 1968 3 Sheets-Sheet 1

INVENTORS
Richard J. Chen
and
Nicholas Gold
and
Paul B. Mason

BY

Brown and Mikulka
and
Alfred E. Corrigan
ATTORNEYS

INVENTORS
Richard J. Chen
and
Nicholas Gold
and
Paul B. Mason
BY
Brown and Mikulka
and
Alfred E. Corrigan
ATTORNEYS INVENTORS
Richard J. Chen
and
Nicholas Gold
and
Paul B. Mason BY
Brown and Mikulka
and
Alfred E. Corrigan
ATTORNEYS United States Patent Office 3,536,401
Patented Oct. 27, 1970

3,536,401
PAPER TRANSPORT SYSTEM

Paul B. Mason, Magnolia, Nicholas Gold, Arlington, and Richard J. Chen, Winchester, Mass., assignors to Polaroid Corporation, Cambridge, Mass., a corporation of Delaware Filed Apr. 22, 1968, Ser. No. 722,853
Int. Cl. G03b *17/50*
U.S. Cl. 355—28 15 Claims

ABSTRACT OF THE DISCLOSURE

A film transport system for a document copier with an endless vacuum belt for performing a variety of functions including (1) moving a section of photosensitive sheet into position for exposure, (2) supporting the sheet in the exposure zone, (3) directing the sheet to a pair of drive rolls for subsequent delivery to a liquid developer applicator, (4) receiving the sheet section from the applicator and supporting the section while it is being processed and, (5) delivering the section to a dryer. Also included are guide members for directing the sheet through the liquid applicator and back onto the endless belt for subsequent delivery to the dryer.

Photographic apparatus of the type comprehended by the present invention generally includes means for exposing successive areas of a light-sensitive, image-recording sheet to light from a subject, e.g., a page of a book, a photograph, etc.; treating the exposed area of each section with a liquid processing agent to form a visible (positive) image of the subject; and cutting the exposed, image-recording sheet into sections each including an exposed area. The exposure system of the apparatus generally comprises means for storing a coil of the photosensitive sheet, means for supporting successive sections of the photosensitive sheet in position for exposure, means for locating a subject in position for exposure, means for illuminating the subject, and an optical system including an objective lens for producing an image of the subject on the section of the photosensitive sheet positioned for exposure. The processing system comprises means for moving a section of the photosensitive sheet from the storage means into the exposure plane of the objective lens and, subsequent to exposure of the section, severing the exposed section of the photosensitive sheet from the remainder of the sheet; directing the exposed sections of the photosensitive sheet to a liquid applicator whereat processing liquid is applied to the surface of the exposed section to effect visible image formation; transporting the section impregnated with the processing liquid through an imbibition chamber in which image formation occurs; moving the exposed section to a dryer; and finally delivering the processed section of the photosensitive sheet to the user of the apparatus.

An object of the invention is to provide, in photographic apparatus of the type described including storage means for a photosensitive sheet, an exposure station including means for locating a section of a photosensitive sheet in position for exposure, a cutter for severing an exposed section from the remainder of the photosensitive sheet, a processing station including a liquid applicator for applying processing liquid to the exposed section of the photosensitive sheet and a dryer for drying the exposed and processed section, novel and improved means for transporting the section of photosensitive material from the storage means through the exposure and processing stations to the dryer of the apparatus.

Another object of the invention is to provide in apparatus as described, a transport system including an endless belt for supporting, moving and locating a section of a photosensitive sheet during exposure and processing, and means for removing the exposed section of photosensitive sheet from the belt and moving the exposed section through a liquid applicator wherein processing liquid is applied to the exposed section and moving the exposed section back onto the belt for movement to the dryer.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
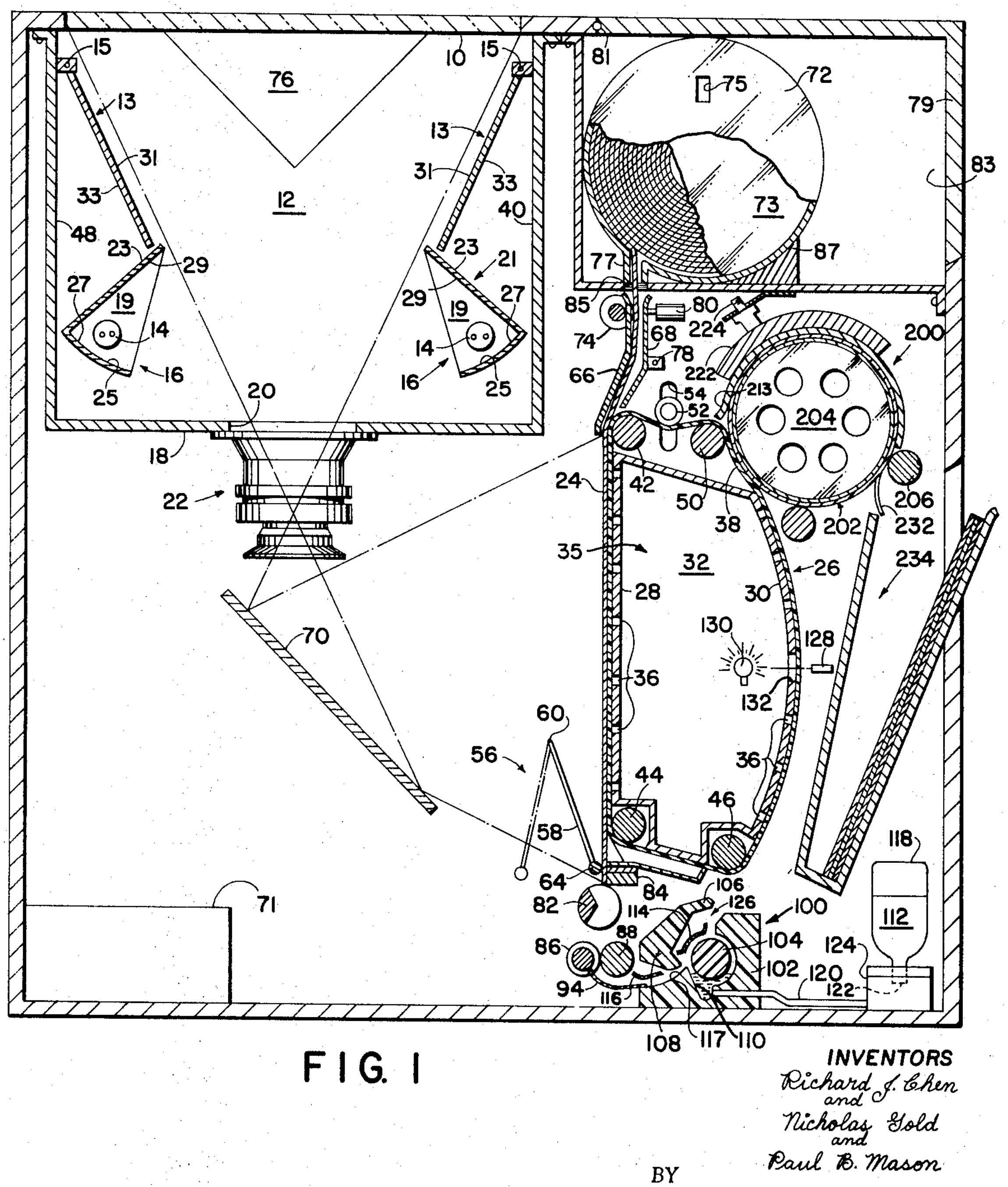
FIG. 1 is a sectional, elevational view of photographic document copying apparatus embodying the invention.

The document copying apparatus embodying the instant invention is shown in FIG. 1 as including an exposure system comprising a generally horizontal, transparent window 10 comprising one end wall of a chamber 12 in which are mounted lamps 14 and baffle means 16 for illuminating an original document positioned for exposure on the upper surface of window 10. The chamber is defined by walls comprising the housing of the apparatus including a lower wall 18 located towards the other end of chamber 12 and provided with a centrally located opening 20 in which is mounted an objective lens and shutter assembly 22 of a conventional type employed in photography and side walls 40, 48 which define opposite sides of chamber 12. The apparatus is primarily intended to photograph rectangular subjects and accordingly, window 10 is rectangular in shape having length and width dimensions at least equal to those of the largest document, e.g., 8½ x 14 inches, usually reproduced.

Figure 2:
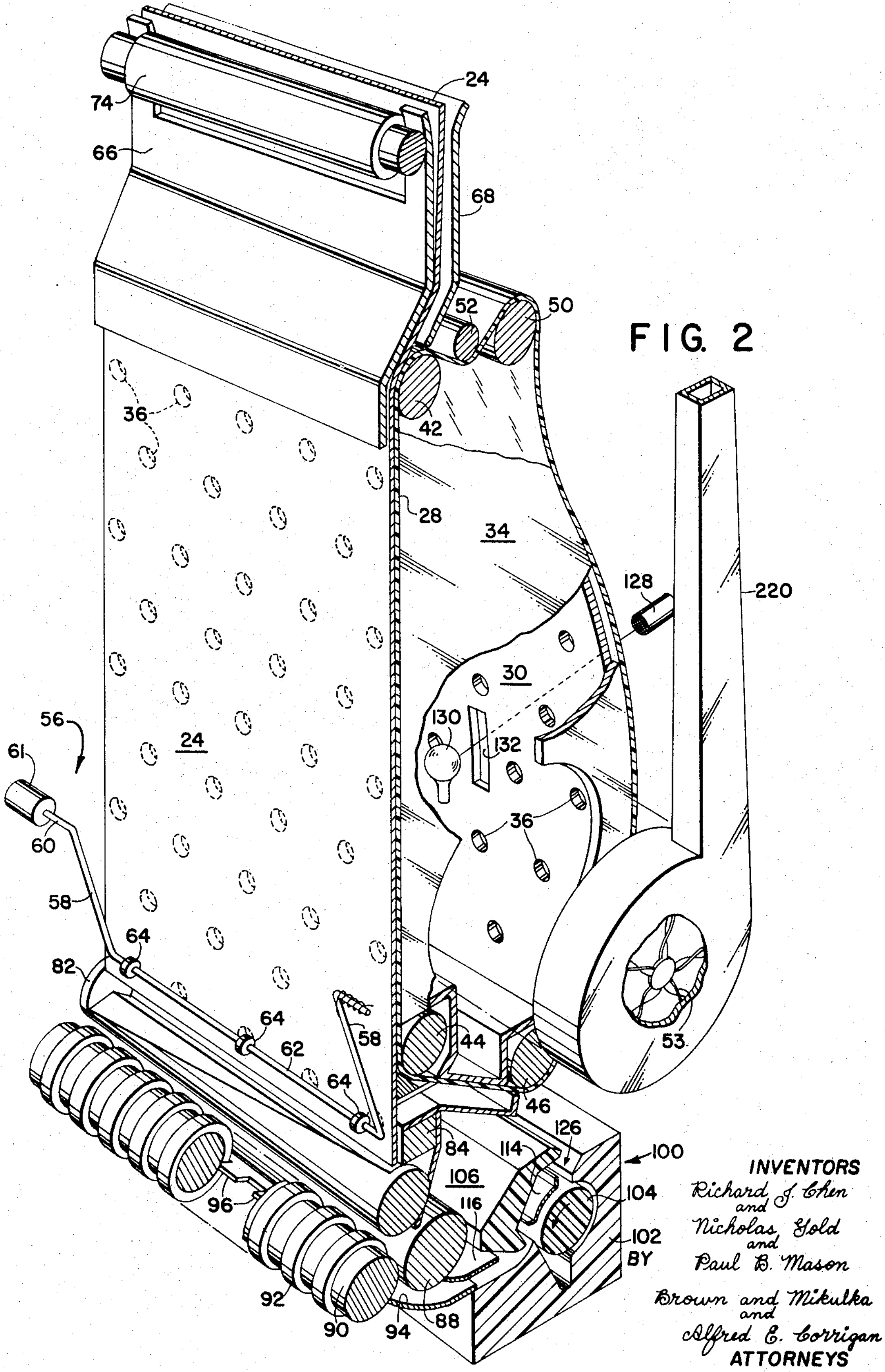
FIG. 2 is a perspective view of the transport and applicator systems employed in the photographic document copying apparatus.

Means are provided for supporting successive areas of a light-sensitive, image-recording sheet designated 24, in position for exposure to light from an original, positioned in window 10, transmitted by lens 22. These means include a housing 26 comprised of a substantially planar wall 28, a curved wall 30 and end members 32, 34, all of which cooperate to form a chamber 35. Walls 28 and 30 are substantially of the same width as sheet 24 and are provided with a plurality of apertures 36. An endless belt 38 mounted on drive rolls 42, 44, 46, 50 and having an adjustable tensioning roll 52 mounted for movement in slot 54, encompasses the chamber 35. Belt 38, which is perforated throughout and is made from any suitable material such as an organic plastic sheet, for example, a film of polyethylene terephthalate resin, such as Mylar, is of substantially the same width as walls 28 and 30, and is comprised of a first span located between roll 42 and a knife 82 for supporting a section of sheet 24 in position for exposure and a second span located between rolls 46 and 50 for supporting the exposed section during development thereof. Blower means 53 (FIG. 2) mounted on side wall 34 is provided for reducing the pressure within chamber 35 to hold the photosensitive sheet 24 against belt 38, i.e., the lower pressure within chamber 35 acts upon sheet 24 by virtue of apertures 36 and the perforations in the belt 38. As can be seen in FIG. 2, a section of photosensitive sheet 24 is held in position for exposure by a generally U-shaped member 56, the legs 58 of which are pivotally attached at their free ends to suitable support means by pivot means 60. The other ends of legs 58 are connected by a member 62 having a plurality of resilient discs 64 mounted thereon. U-shaped member 56 is spring biased against the lower end of the sheet 24 such that resilient members 64 contact the bottom portion of the section of the photosensitive sheet 24 and hold it against member 84. A rotary solenoid 61 is coupled to the member 56 for pivoting it to the dotted line position shown in FIG. 1. The upper portion of the section of photosensitive sheet 24 is maintained in place by guide members 66, 68.

A mirror 70 is arranged substantially at a 45° angle with respect to the axis of lens 22 and the plane of wall 28 for redirecting light from the lens toward the wall 28 and the section of photosensitive sheet 24 positioned thereon, and producing the geometric image reversal required for a correct copy of the original. Mounted below the mirror 70 is a compartment 71 for housing controls of the apparatus.

Photosensitive sheet 24 is supplied coiled upon a spool mounted within a container 72 mounted above housing 26. The spool is provided with a pair of disc members 73, only one of which is shown, and container 72 is provided with an opening 75 through which brake means 150 (see FIG. 4) may be applied to one of the discs to retard rotation thereof, i.e., to prevent free-wheeling of the spool when sheet 24 is being withdrawn therefrom. Brake means 150 is mounted on a wall of chamber 83 and is comprised of a pressure-bearing member 152, a tube 154 telescopically receivable in a member 152 and a spring 156 for exerting a force against member 152. In order to maintain member 152 in engagement with tube 154, member 152 is provided with a pin 158 which rides in a groove 160 in tube 154. The end of member 152 is tapered at 162 to facilitate entry of the brake means into opening 75. The braking force of the brake means 100 is greater than that exerted on the sheet 24 by the belt 38 but less than the force exerted on the sheet by the drive roll 74. Container 72 is provided with a neck portion 77, having suitable light shield means therein, through which a portion of sheet 24 originally protrudes. To load the container 72, a door 79 hinged about 81 is pivoted to the open position and the container positioned within compartment 83 such that the neck portion 77 is in alignment with an opening 85 in chamber 83. In this position the protruding portion of sheet 24 falls in place between suitable advancing means as will be shortly explained. Any suitable means such as block 87 may be provided to facilitate the proper positioning of container 72.

The sheet 24 is advanced from the container 72 by a feed roll 74 cooperating with guide 68. Guide 68 is pivotally mounted to a suitable support by pivot means 78 and means such as a solenoid 80 are provided for pivoting guide 68 about pivot 78 such that the end of sheet 24 which is between guides 66, 68 is forced into contact with feed roll 74.

In photographic apparatus of the foregoing type, it has been found that a certain amount of vignetting occurs along the outer edges of the section of photosensitive sheet 24, positioned adjacent wall 28 when the material supported by window 10 is exposed. This vignetting or darkening, is due in part to the fact that a light ray emanating from lamp 14 and directed towards an opposite end of an original positioned for exposure on window 10, must travel further than one directed at a center portion of the original or document, thereby having less energy (ability to photographically expose the original) than the wave directed toward the center portion. In other words, the intensity of the light incident upon window 10 by lamps 14 diminishes as you move from the center of window 10 outwardly towards the ends and sides thereof. Needless to say, this vignetting is undesirable in that it reduces the effective area of the sheet positioned adjacent wall 28 which is available for reproducing the image of the object placed on window 10.

To obviate this problem there is provided a structure comprised of two baffle means 16 having a longitudinal dimension substantially equal to the width of chamber 12, i.e., they run substantially the length of walls 40, 48, a pair of generally planar deflectors 13 pivotally mounted at 15 to the side walls 40, 48 of chamber 12 and a pair of triangular members 76, one being mounted on each of the remaining side walls of chamber 12. Members 76 are provided with a reflective coating, e.g., a matt or white calender finish, for increasing the intensity of the light incident upon the intermediate surfaces of the sides of the original positioned between and transverse to walls 40, 48. Each of the baffle means 16 is comprised of a pair of end plates 19 which are connected by generally C-shaped members 21. Members 21 include a baffle portion 23 which substantially prevent any light emanating from its associated lamp 14 from directly striking the major portion of window 10 which is located at the same side of the chamber 12, and a curved surface 25 having a generally parabolic configuration in cross section. The interior surfaces 27 of members 21 have a spectral or mirror-like finish in contrast with surfaces 29 which have an absorptive finish, e.g., flat black paint. Surfaces 31 of deflectors 13 are provided with a diffusingly reflective surface, e.g. gray. Baffle portion 23, in addition to substantially preventing any light emanating from its associated light source from directly striking an adjacent side or portion of window 10, also prevents any light from its associated light-producing means from being reflected directly by the window 10 to the lens in assembly 22. In order to reduce specular reflections, the exterior surfaces of the baffle means 16, the surfaces 33 of deflectors 13, end plates 19 and the interior side walls and lower wall 18 of chamber 12 all have a substantially absorptive or nonreflective type finish thereon, e.g., a flat black paint.

As can be seen in FIG. 1, light emanating from a lamp 14 is reflected by the reflector surface 27 of its associated baffle means 16 toward an opposite side of chamber 12 and is deflected by the baffle portion 23 towards an opposite side of window 10, i.e., light emanating from the lamp 14 positioned at the left hand side (as viewed in FIG. 1) of chamber 12 is reflected and directed towards the opposite or right hand side of window 10. Also, some of the light emanating from the left hand lamp 14 is reflected by surface 31 of the deflector 13 mounted near the right hand side of chamber 12 and redirected towards the adjacent portion of window 10, i.e., the right hand portion. This redirected light adds to the intensity of the light incident upon the right hand side of window 10 such that the intensity of the light incident upon the window increases outwardly from the center of window 10. The pivotal connection 15 provides a means whereby the angle which the deflectors 13 make with respect to the plane of window 10 may be changed to vary the rate at which the intensity of the light incident upon the window changes. It has been found that an angle of 65°, as measured between the deflector 13 and window 10, will provide the required change in intensity incident upon window 10 when the angle between a plane parallel with the axis of lens 22 and a plane containing the free ends 37 of end members 19 is approximately 16°. Although chamber 12 is shown as being provided with two fluorescent lamps 14, it is within the scope of the invention to have a single fluorescent tube mounted adjacent wall 18 and extending substantially around the periphery of chamber 12; or, the fluorescent tube may be replaced by a plurality of incandescent lamps, e.g., one placed at each corner of chamber 12 adjacent wall 18.

When it is desired to expose the section of sheet 24 which is in position for exposure, a switch is closed to complete a circuit through blower 53 and the motor for driving roll 74, paper transport rolls 42, 44, 46, and 50, paper feed rolls 86, 88 and the rolls for rotating the dryer drum. After a predetermined period of time, during which the pressure within housing 35 has reduced to a level sufficient to hold sheet 24 against belt 38, solenoid 61 pivots U-shaped member 56 to the dotted line position shown in FIG. 1 wherein cross member 62 is located outside of the projected image of the original. Subsequent to movement of U-shaped member 56 to the dotted line position, lamps 14 are turned on and the shutter assembly 22 is actuated to expose sheet 24. After the section of sheet 24 has been exposed, solenoid 80 is actuated to pivot guide 68 about pivot 78 and force sheet 24 into frictional engagement with drive roll 74. Alternatively, guide 68 could be stationary and drive roll 74 could be mounted on guide 66 which in turn would be pivotally coupled to the apparatus in a manner similar to that of guide 68. Roll 74 is maintained out of contact with the sheet when the roll is not rotating in order to prevent damage to the sheet 24 by impression. The exposed section is then fed past the knife 82 and into the bite of a pair of drive rolls 86, 88. Drive roll 86 (see FIG. 2) is comprised of a shaft 90 having a plurality of axially spaced discs 92 mounted thereon. Positioned adjacent rolls 86, 88 is a guide member 94 having a plurality of fingers 96 thereon, said fingers being adapted to enter the spaces between discs 92 to insure that the leading edge of the section will be directed toward a liquid applicator indicated generally by reference character 100.

Applicator 100 includes a body 102, a roll 104, and a cover 106 pivotally mounted at 108 to body 102 for sealing engagement therewith in the closed position. Body 102 is formed with an elongated well 110 extending substantially from end to end of the body and having a length at least equal to the width of the sheet material 24 to be coated. Roll 104 is cylindrical, has a length at least equal to the width of the area of the sheet material 24 to be coated, is partially submerged in a processing liquid 112 located in well 110, and is mounted for counterclockwise rotation (as viewed in FIG. 1). Mounted between body 102 and cover 106 is a guide member 114 which cooperates with another guide member 116 and portion 117 of body 102 for directing the exposed section in a path tangent to the surface of roll 104. For a more detailed description of applicator 100 reference is made to the copending U.S. application of Nicholas Gold, Ser. No. 723,040 filed on even date herewith.

The processing liquid 112 is contained in a container 118 and is delivered to the well 110 via a line 120. The open end 122 of container 118 is immersed in a vessel 124 and the height of the liquid in vessel 124 and in well 110 is controlled in part by the negative pressure in that portion of container 118 that lies above the level of the liquid in the container 118. When the level of the liquid in vessel 124 drops below the open end 122 an air bubble can rise to the top of container 118 thereby allowing some of the liquid therein to flow into vessel 124.

The liquid processing composition 112 is applied to one side of the exposed photosensitive sheet 24 for permeation into the sheet to effect the formation of a visible image. The applicator 100 is designed to apply a predetermined quantity of a non-viscous liquid to the exposed side of the photosensitive sheet, preferably to effect image formation by a silver halide diffusion transfer process. For examples of such processes and the materials useful therein, reference may be had to copending U.S. applications Ser. No. 519,995 of Edwin H. Land, and Ser. No. 519,884 of Edwin H. Land et al., both filed Jan. 1, 1966. These applications describe a combination image-recording and image-receiving sheet comprising a support such as paper, at least one layer containing a light-sensitive material such as a silver halide emulsion, and an outer layer comprising a translucent material such as finely divided titanium dioxide dispersed in a suitable, permeable, colloidal carrier or matrix such as gelatin which is permeable to an aqueous processing liquid. The translucent pigment may be incorporated in the layer containing the light-sensitive material and/or may comprise a separate outer layer which may also contain silver precipitating nuclei and is sufficiently transparent to permit exposure of the light-sensitive layer therebeneath, while at the same time, being sufficiently opaque to provide the requisite background for a positive silver image transferred thereto by diffusion and to mask a negative image formed thereunder. Processing of the exposed image-recording sheet is accomplished by applying an aqueous liquid including a silver halide complexing agent to the side of the sheet opposite the support so as to impregnate the light-sensitive layer with sufficient processing liquid to produce a positive silver transfer image on the surface of the translucent layer.

The processing liquid may be non-viscous, i.e., have the viscosity of water, or it may include a film forming agent and range in viscosity from that of water to a viscosity of 200,000 centipoises at 20° C. The operation and construction of the liquid applicator will depend to a large extent upon the nature and viscosity of the liquid, but in any event, will be designed to apply the processing liquid to at least the exposed (rectangular) area of each section of the photosensitive sheet as the section is advanced through the processing section of the apparatus.

After the exposed section of sheet 24 has been treated with processing liquid, it is redirected back onto the perforated belt 38 by guide 114 and the slot 126 formed between body 102 and cover 106. The guide 114 and slot 126 cooperate to direct the exposed section of sheet 24 in a path which is tangent to the portion of belt 38 supported by wall 30. This permits the exposed section to be gently placed on the moving belt and precludes the leading edge of the exposed section from stubbing itself against the belt. When the exposed section contacts the moving belt 38, the lower pressure within housing 26 provides the means for maintaining the exposed section in position on the belt. Located adjacent curved wall 30 is a control in the form of a photocell 128. Photocell 128 is responsive to light emanating from a light source 130 positioned within housing 26 via an elongated slot 132 for maintaining the circuit to the knife solenoid (not shown) in an open condition and the circuit for solenoid 80 in a closed or conducting condition. The exposed section continues to be advanced upwardly (as viewed in FIG. 1) by belt 38 until the leading edge of the exposed section is sensed by photocell 128. At this point, the paper interrupts a beam of light being emitted by lamp 130 and directed from housing 26 via slot 132 toward the photocell. When the light falling on the photocell is interrupted, a circuit is opened for allowing solenoid 80 to pivot guide 68 in a clockwise manner (as viewed in FIG. 1) thereby releasing sheet 24 from frictional driving engagement with roll 74. Simultaneously, the circuit to the knife solenoid is completed thereby actuating knife 82 to sever the exposed section from the remainder of sheet 24. If the length of the copy is to be fourteen inches, then photocell 128 will be located fourteen inches from the knife 82 as measured along the path of travel of the exposed section. Also, if desired, slot 132 could be elongated so as to measure several inches in length and photocell 128 and lamp 130 could be mounted for simultaneous movement along the length of the slot to vary the length of the severed section in proportion to the size of the original being reproduced.

After the severed section has made full contact with belt 38, i.e., belt 38 is completely supporting the severed section, belt drive rolls 42, 44, 46 and 50 are stopped and the severed section held in position against belt 38 for a predetermined period of time until the diffusion transfer process has been substantially completed. Belt drive rolls 42, 44, 46 and 50 are again started and the severed section is advanced toward a dryer station indicated generally at 200 whereat the exposed section of sheet 24 is dried.

Figures 3, 4:
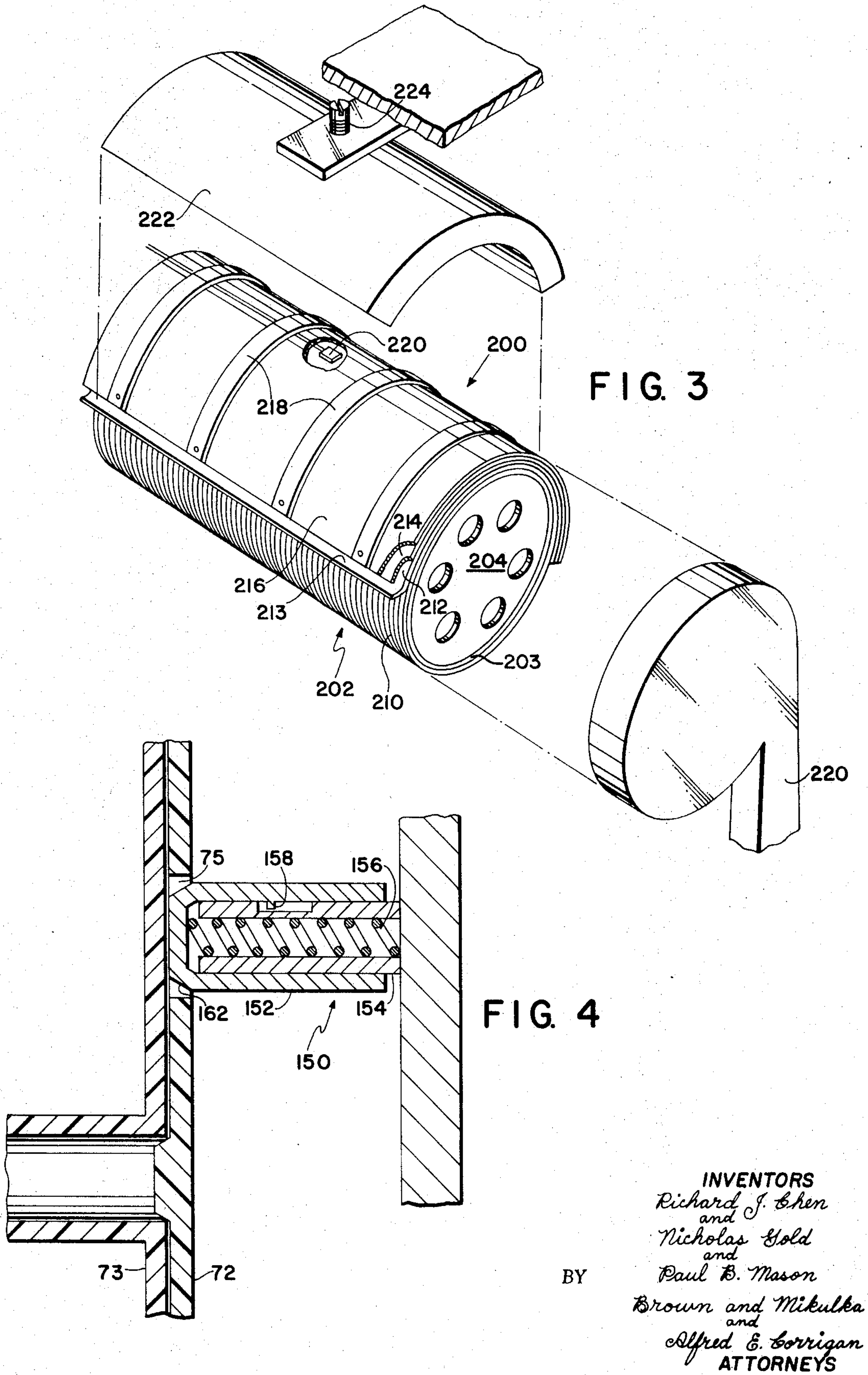
FIG. 3 is a perspective view of the dryer section employed in the apparatus.
FIG. 4 is a sectional view of a brake means utilized in the instant invention.

As can be clearly viewed in FIG. 3, dryer station 200 is comprised of a perforated hollow cylindrical member 202 suitably supported for clockwise rotation (as viewed in FIG. 1) about its longitudinal axis by drive rolls 50, 206 and 208. The ends of member 202 are provided with apertured end plates 204, the plates being apertured to allow air being exhausted from housing 26 to pass through the interior of cylindrical member 202 as will be more fully explained hereinafter. A layer of porous, compliant material 203, e.g., open cell polyurethane foam or felt, is wound around member 202. A layer having a textured surface such as a pile fabric 210, is positioned about the external surface of material 203 and secured in place by suitable means. Alternatively, a layer of cotton kite string could be tightly wound in a helical fashion about layer 203. The layer of pile fabric or cotton string thus presents a continuous unbroken surface i.e., there is no transverse line formed by the joining of the ends of a single sheet of material.

Mounted above and in contact with the outer layer 210 of cylindrical member 202 is a heater assembly comprised of a platen 212 made from a sheet of stainless steel, a heating element 214, e.g., a sheet heating element manufactured by the Chemelex Corporation of Danbury, Conn., and sold under the trademark "Cellotherm"; and a layer of asbestos 216 suitably held in contact with each other by a plurality of straps 218. Platen 212 has a reverse curve portion 213 for deflecting the leading end portion of the exposed section of sheet 24 into the bite between cylindrical member 202 and platen 212. The temperature of the assembly is controlled by a temperature responsive switch 220 imbedded in sheet 214 and having leads which pass through the asbestos layer 216. Each of the layers 212, 214, 216 extends the length of member 202. A pressure plate 222 having an adjusting means 224 is mounted above the heater assembly.

As the exposed section of sheet 24 passes between roll 50 and cylindrical member 202, its leading edge is deflected by portion 213 of platen 212 into the bite between platen 212 and the rotating cylindrical member 202. The leading edge of the exposed section lifts platen 212 from contact with cylindrical member 202 so as to allow the exposed section to pass therebetween. Heat from platen 212 drives any processing liquid on the exposed section into the layer of pile fabric or string on cylindrical member 202 and subsequently into the compliant porous layer 203 and finally through the perforations in cylindrical member 202 where it is carried off to a suitable reservoir by the flow of air therethrough generated by blower 53. The flow of air through cylindrical member 202 is conducted thereto via duct 220.

The exposed section is carried through the dryer station until its leading edge contacts a guide member 232 whereupon member 232 guides the exposed section from the surface of cylindrical member 202 into a delivery station 234. Drying of the exposed section as it passes through the dryer station has a tendency to make the dried copy assume a curved configuration. Accordingly, the curvature of guide 232 is very important and is selected to assure that the finished copy delivered to section 234 assumes a substantially flat configuration.

From the foregoing it is apparent that there has been disclosed a novel apparatus for advancing a section of a photosensitive sheet from a container into position on a perforated belt for exposure; moving the exposed section through an applicator station; severing the exposed section from the remainder of the sheet; moving the exposed section back onto the perforated belt; allowing the exposed section to develop and subsequently drying the exposed section.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus for exposing and processing successive sections of a photosensitive sheet comprising, in combination:

storage means for holding a supply of a photosensitive sheet;

an endless perforated belt;

means supporting said belt at its inner surface so as to define at least two relatively long spans;

means for drawing air inwardly through the portions of said belt comprising said spans to retain sheet material against the outer surfaces of said portions of said belt;

first drive means located between said storage means and one end of said first span for engaging and withdrawing sheet material from said storage means and advancing said sheet material into face-to-face contact with said portion of said belt comprising said first span;

exposure means for exposing a section of said sheet material retained against said portion of said belt comprising said first span;

a liquid applicator station located near the opposite end of said first span and one end of said second span for applying a processing liquid to said sheet material during movement thereof through said applicator station;

second drive means intermediate said first span and said applicator station for advancing said sheet material from said first span of said belt into and through said applicator station and into face-to-face contact with a portion of said belt comprising said second span at said one end of the latter;

cutting means located between said opposite end of said first span and said second drive means for severing a section of said sheet material being advanced through said applicator station from the next succeeding section of said sheet material retained against said first span of said belt in position for exposure; and means for moving said belt and said first and second drive means to advance said sheet material from said storage means onto said belt at said one end of said first span and from said belt at said opposite end of said first span through said applicator station and thence onto said second span of said belt.

2. Photographic apparatus as defined in claim 1 wherein said first drive means include a driven member for frictionally engaging and moving said sheet material, a backing member for supporting said sheet material in frictional engagement with said driven member and means for moving one of said members relative to the other to commence and discontinue movement of said sheet material.

3. Photographic apparatus as defined in claim 2 wherein said driven member comprises a friction roll and means for rotating said friction roll.

4. Photographic apparatus as defined in claim 1 wherein said storage means include means for applying a braking force to said sheet material resisting withdrawal movement of said sheet material from said storage means, said braking force exceeding the advancing force exerted on said sheet material by said belt and being les than the advancing force exerted by said first drive means.

5. Photographic apparatus as defined in claim 1 including holddown means for engaging the end portion of a section of said sheet material adjacent said cutting means for holding said sheet material against said first span of belt in position for exposure.

6. Photographic apparatus as defined in claim 5 wherein said holddown means include a sheet engagement member moveable into and from engagement with said sheet and means for moving said sheet engagement member into engagement with said sheet when said means for drawing air through said belt are inoperative and moving said sheet engagement member from engagement with said sheet when the last mentioned means are operating.

7. Photographic apparatus as defined in claim 1 including control means for actuating said cutting means to sever said sheet when an exposed section of said sheet has been advanced from exposure position past said cutting means and simultaneously disenabling said first drive means to withdraw said sheet material from said storage means when a succeeding section of said sheet is located in position for exposure against said first span of said belt.

8. Photographic apparatus as defined in claim 7 wherein said control means are operative to actuate said cutting means and disenable said first drive means during movement of said belt, and said storage means include means for applying a braking force to said sheet material resisting withdrawal movement of said sheet material from said storage means, said braking force exceeding the advancing force exerted on said sheet material by said belt.

9. Photographic apparatus as defined in claim 7 wherein said belt is light-transmitting and said control means including a light source and photoresponsive means located on opposite sides of a portion of said belt comprising said second span for sensing the leading edge of an exposed section of said sheet advanced by said belt from said applicator station.

10. Photographic apparatus as defined in claim 1 including dryer means comprising a rotary drum supported against the outer surface of said belt adjacent the other end of said second span.

11. Photographic apparatus as defined in claim 1 wherein said means for drawing air inwardly through said spans of said belt comprise a chamber having first and second perforate walls located against the inner surfaces respectively of said first and second spans.

12. Photographic apparatus as defined in claim 11 including dryer means comprising a rotary drum supported against the outer surface of said belt adjacent the other end of said second span.

13. Photographic apparatus as defined in claim 12 including an impeller coupled with said chamber and said rotary drum for withdrawing air from said chamber and propelling said air through said rotary drum.

14. Photographic apparatus as defined in claim 1 wherein said applicator station includes means for applying liquid to the surface of said sheet facing away from said belt and means for guiding said sheet from said applicator station along a path coincident with the outer surface of said belt near said one end of second span.

15. Photographic apparatus for exposing and processing successive sections of a photosensitive sheet comprising, in combination:

storage means for holding a supply of photosensitive sheet;

an endless perforated belt;

a chamber located within the loop defined by said belt, said chamber including first and second perforate walls positioned against the inside of said belt for supporting portions of said belt;

means for drawing air into said chamber through said first and second walls and said portions of said belt supported thereagainst to retain sheet material against said portions of said belt;

first drive means located between said storage means and one end of said first wall for engaging and withdrawing sheet material from said storage means and advancing said sheet material into face-to-face contact with a portion of said belt supported against said first wall;

exposure means for exposing a section of said sheet material retained against said portion of said belt located against said first wall;

a liquid applicator station located near the other end of said first wall and one end of said second wall for applying a processing liquid to said sheet material during movement thereof through said applicator station;

second drive means intermediate said first wall and said applicator means for advancing sheet material from said belt into and through said applicator station into face-to-face contact with a portion of said belt supported against said second wall;

cutting means located between said other end of said first wall and said second drive means for severing a section of sheet material being advanced through said applicator station from the next succeeding section of said sheet material retained in position for exposure against said portion of said belt supported against said first wall; and means for moving said belt and said first and second drive means to advance said sheet material from said storage means onto said belt into position for exposure, from said belt through said applicator station and then onto the portion of said belt supported against said second wall.

References Cited

UNITED STATES PATENTS

| | | | |
|---|---|---|---|
| 3,079,839 | 3/1963 | Lohner et al. | 271—74 XR |
| 3,282,177 | 11/1966 | Stanton | 355—11 XR |
| 3,289,532 | 12/1966 | Baumgarten et al. | 355—28 |
| 3,382,763 | 5/1968 | Bruning | 271—74 XR |
| 3,425,777 | 2/1969 | White | 355—28 |

NORTON ANSHER, Primary Examiner

R. L. MOSES, Assistant Examiner

U.S. Cl. X.R.

271—74; 355—10, 66, 73